United States Patent [19]
Michaud et al.

[11] Patent Number: 5,973,055
[45] Date of Patent: Oct. 26, 1999

[54] WATER REPELLENT COMPOSITION

[75] Inventors: Pascal Michaud, Saint Gratien; Bruno Costes, Deuil-la-Barre; Yves Henry, Le Chesnay; Pierre Lascours, Cugnaux, all of France

[73] Assignees: Aerospatiale Societe Nationale Industrielle; Elf Atochem S.A., both of Paris, France

[21] Appl. No.: 08/995,001

[22] Filed: Dec. 19, 1997

[30] Foreign Application Priority Data

Dec. 27, 1996 [FR] France .................................. 96 16097

[51] Int. Cl.$^6$ ...................................................... C08K 5/02
[52] U.S. Cl. .............................................................. 524/462
[58] Field of Search ............................................. 524/462

[56] References Cited

U.S. PATENT DOCUMENTS

| | | | |
|---|---|---|---|
| 3,442,664 | 5/1969 | Heine et al. . | |
| 5,211,873 | 5/1993 | Dams | 521/131 |
| 5,219,538 | 6/1993 | Henderson | 428/402.2 |
| 5,221,329 | 6/1993 | Tarr . | |
| 5,275,669 | 1/1994 | Van Der Puy | 134/42 |
| 5,409,736 | 4/1995 | Leiner | 427/372.2 |
| 5,456,948 | 10/1995 | Mathisen | 427/387 |
| 5,741,825 | 4/1998 | Inagaki | 521/88 |

FOREIGN PATENT DOCUMENTS 0 545 201 A2   6/1993   European Pat. Off. .

OTHER PUBLICATIONS

*Database WPI*, Section Ch, Week 8932, Derwent Publications Ltd., London, Great Britain.
*Database WPI*, Section Ch, Week 8629, Derwent Publications Ltd., London, Great Britain.
*Database WPI*, Section Ch, Week 9439, Derwent Publications Ltd., London, Great Britain.
*Database WPI*, Section Ch, Week 9628, Derwent Publications Ltd., London, Great Britain.
*Database WPI*, Section Ch, Week 9618, Derwent Publications Ltd., London, Great Britain.

*Primary Examiner*—Paul R. Michl
*Attorney, Agent, or Firm*—Burns, Doane, Swecker & Mathis LLP

[57] ABSTRACT

The invention relates to a water repellent composition (<<Rain Repellent>>), comprising a hydrophobic agent and a solvent compatible with the hydrophobic active agent, characterized in that the solvent comprises at least one fluorinated hydrocarbon, liquid at ambient temperature, and in that the active hydrophobic agent is a compound of organopolysiloxane type.

The invention also relates to a disposable pressurized container containing the above composition and an inert gas.

The invention finds application in particular in the removal of water from a surface especially the windscreen of vehicles or aircraft.

28 Claims, No Drawings

WATER REPELLENT COMPOSITION

FIELD OF THE INVENTION

The invention relates to a water repellent composition, also called an anti-wetting composition, also called in English a Rain-Repellent composition, which is used to prevent the depositing of liquid in particular of water or an aqueous liquid on a surface, it particularly relates to a composition to prevent the depositing of water or to repel rainwater or any other water falling on a preferably transparent surface, in particular a glass surface, for example the surface of a window and especially the surface of a windscreen of a vehicle or aircraft, preferably the surface of the windscreen of an aeroplane cockpit.

PRIOR ART AND PROBLEM RAISED

Several solutions have been put forward to remove or repel liquids, in particular rain or other precipitations, from windows and other transparent surfaces such as the windscreens of vehicles, boats, aeroplanes and other aircraft, especially in order to maintain clear vision through such windscreens, indispensable for passenger safety and comfort. The problem of visibility during heavy rain is one of the longer known problems encountered in air transport in particular, this problem having become more acute with the advent of <<jet >> aeroplanes.

The solutions considered may be classified into two main categories:
  mechanical means
  chemical means In the first category, windscreen wipers have been and still are successfully used on windscreens—but also on other glass surfaces: headlights, camera windows etc.—in motor vehicles, boats, locomotives, and other vehicles as well as aeroplanes and other aircraft (helicopters, etc.).

Planes in particular use windscreen wipers that are similar to car windscreen wipers but operate at greater speed and the wipers are applied with greater pressure onto the windscreen.

In order to be effective, however, windscreen wipers require high stroke speeds and consequently high electricity consumption to operate the associated devices.

To repel water from windscreens it has also been suggested to use a jet of compressed air. This is a heavy system if independently operated or penalizes aircraft performance if the required compressed air is taken from the engines.

The second category of solutions considered concerns chemical means, such means being used either alone or in addition to the mechanical means described above. As a general rule these means consist of making the surface hydrophobic, that is to say not wettable by water, the treated surface thereby becoming water repellent. In other words, on the treated surface, for example the outer surface of the windscreen made non-wettable by its hydrophobic coating, any water is broken up into tiny droplets and carried away by the high speed air flow passing over the windscreen. Excellent visibility can therefore be obtained which is superior to that achieved with mechanical processes used alone.

Numerous documents have been published relating to the application of coatings on surfaces, in particular transparent surfaces, to make them water repellent and non-wettable.

U.S. Pat. Nos. 2,612,458 and 2,777,772 describe water repellent products made up of substitution polysilanes applied by friction with a friction agent on a clean, dry windscreen.

U.S. Pat. No. 2,923,633 relates to water repellent or rain-repellent products for windscreens, in particular for windscreens of vehicles which move at great speed, which contain polysilanes comprising alcoxy groups. These products are mixed with carbon black or red acting as friction agent to form a paste which is rubbed onto a clean, dry windscreen. The application of an additional layer of wax is not necessary.

U.S. Pat. No. 2,962,390 concerns a water repellent composition in which first an alcoxysilane alkyl paste is applied to the surface to be treated, using carbon black for example, which is then coated with a layer of water repellent paraffin wax, and a polyamide resin. The treated surface must be clean and dry.

These compositions have the immense drawback of having to be applied to a dry surface in order to be effective and cannot therefore be used during flight or in rain. They require often long and complicated application procedures and therefore extended grounding of the aircraft. The suggestion has also been put forward to expose the surfaces to be treated, such as aeroplane windscreens, to methylchlorosilane vapours to make them water repellent, but this is a long, complex operation and also requires extended grounding of the aircraft.

Numerous water repellent compositions also require a hardening stage, especially by heat, in order to be operational which means that despite the excellent protection obtained their use is extremely restrictive.

It is for this reason that other water repellent compositions contain alkylpolysiloxanes and strong acids in a solvent and are described in particular in U.S. Pat. No. 3,579,540; these compositions form a film that is highly resistant over a long period, but they have the essential disadvantage of being corrosive especially for metal parts.

U.S. Pat. No. 5,021,089 describes water repellent compositions without strong acid and are non-corrosive which contain a silyl phosphate, an organopolysiloxane (dimethyl polysiloxane) and a volatile organic solvent which may be an organopolysiloxane (oligomer) . These compositions are applied to dry, clean glass surfaces to form a uniform film and cannot be applied in the rain.

Similarly, FR-A-2,662,171 relates to a non-corrosive water repellent composition for non-porous materials comprising an alkylpolysiloxane, for example a dimethylpolysiloxane and sodium silicate. For its application, the surface to be treated must first be cleaned and dried, the coating left to dry and then polished.

All these above-described compositions are compositions which adhere strongly to the surface and are of pre-applied coating type with long-lasting action; they can therefore only be applied on the ground, most of the time manually, following a restrictive operating method, leading to extended, costly immobilization of the aircraft. In addition, the application must be made to a clean, dry glass surface that is not exposed to rain, the glass surface must therefore be protected against bad weather during the application of these compositions. The applied coating only has a limited lifetime and disappears through erosion by rain, hail, snow, ice crystals, dust and sand. This may occur during flight with no remedy being available—in particular during the critical landing stage.

It was therefore endeavoured to develop compositions which may be applied in the rain, when bad weather occurs, as and when required, using a device that can easily be put into operation, for example by the aircraft crew, this device being for example in the form of spray nozzles placed in the vicinity of the windscreen.

FR-A-1,390,936 (U.S. Pat. No. 3,310,429) therefore relates to a water repellent composition which can be applied in the rain and during flight, which comprises an active agent of quaternary ammonium compound type or a myristic chromium-acid complex, in a solvent in particular of CFC type (F113 or F112)—and which may be sprayed from a container stored in the aircraft.

Also, U.S. Pat. No. 3,352,709 describes a composition that can be applied during flight and in the rain comprising the quaternary ammonium compound combination of which one—similar to the compounds in U.S. Pat. No. 3,310,429—essentially carries aliphatic radicals, and the other essentially carries polyoxyethylene radicals. The active agents are in solution in a solvent, for example of CFC type, in particular F113, F11 or F21.

U.S. Pat. No. 3,442,664 relates to a water repellent composition, in particular for aircraft windscreens, comprising a mixture of two fluorosilicones as hydrophobic active agent, with optionally a surfactant of quaternary ammonium type in a halogen solvent such as 1,1,1 trichloroethane. Such composition may be applied during flight and under rain conditions.

FR-A-1,416,467 relates to a water repellent composition which may be applied in the rain and during flight, and which comprises as water repellent agent a silicotitanium copolymer which may be dissolved in a suitable solvent of CFC type for example and which is applied by spraying.

U.S. Pat. No. 3,343,750 corresponding to French patent FR-A-1,416,467 also mentions the presence of cationic surfactant agents of quaternary ammonium compound type and cites CFC 113 as solvent.

U.S. Pat. No. 3,366,123 describes in similar manner a water repellent composition which can be sprayed comprising as active agent a compound of silicotitanium, silicosilicium or silicozirconium copolymer type, a cationic spreading agent which is in particular a quaternary ammonium salt, and a solvent of hydrocarbon, alcohol or CFC type (in particular Freon® F113=1,1,2 - 1,2,2 trichlorotrifluoroethane).

Finally, U.S. Pat. No. 5,221,329 describes a water repellent composition in particular for aeroplane windscreens that is substantially similar to that of U.S. Pat. No. 3,343,750, that is to say essentially comprising a copolymer of silicotitanate type as hydrophobic active agent, a quaternary ammonium compound as cationic surfactant, and a solvent chosen for example from hexane, toluene and the halogen hydrocarbons such as CFC 113. This composition is distinctive chiefly in that it also comprises a spreading agent such as d-limonene or methyl salicylate which also acts as an odorous agent for possible leak detection.

These widely used compositions can be used to remedy most of the above-mentioned disadvantages connected with <<pre-applied>> coatings.

It was seen above that these water repellent products may be in the form of solutions stored in containers under pressure similar to aerosol sprays frequently used in other areas, these containers being disposable containers which are replaced by ground maintenance teams. The container placed under pressure using an appropriate inert gas such as nitrogen is connected by a valve to one or more spray nozzles placed adjacent to the windscreen and able to spray the solution of water repellent product onto the windscreen when required.

In the event of rain, the crew may, as and when required, open the valve and spray the product onto the windscreen (see for example U.S. Pat. No. 3,231,196).

The active products applied in this manner must meet a great number of requirements, listed for example in U.S. Pat. Nos. 3,433,750 and 3,766,123, in particular:

they must have a favourable refractive index and acceptable density, they must have no harsh effects on surface materials to which they are applied, in particular for organic and metallic materials used in aeronautics, they must be non-flammable and non-toxic and, needless to say, their application must be possible under rain conditions.

The products of the prior art that are currently the most frequently used, while they may be satisfactory for most of the above-mentioned requirements, nevertheless have the disadvantage of polymerizing on contact with air, which leads to operating defects in the supply and spray systems due in particular to clogging of the valves and sprays. These operating defects may occur at particularly critical moments: landing, take-off . . . when excellent visibility is especially needed.

Also, on drying these products leave deposits on surfaces such as windows and are difficult to remove. Although these deposits impair visibility to a relatively small extent, they are detrimental to the outside appearance of the aircraft. These disadvantages are heightened through successive spraying and subsequent depositing of several layers of product which lead to an increasing loss of visibility. Moreover, as solvent or vector fluid, these spray compositions contain compounds of CFC or chlorofluorocarbide type belonging to the Freon® family, especially F113 Freon® (1,1,2-trichloro-1,2,2-trifluoroethane), which are held responsible for destruction of the stratospheric ozone layer and whose use is subject to increasingly severe regulations which led to their total ban as from Jan. $1_{st}$ 1996 by the Montreal Protocol.

It has been considered to replace the CFC type compounds by HCFC type compounds such as F141b, but increasingly stricter regulations which set out to ban the use of such compounds over the longer term have been or are to be laid down in numerous countries.

It is therefore mandatory to use other solvents or vector fluids which do not have such negative consequences on the ozone layer. However, research into such compounds for their use as specific solvents for water repellent products, comes up against a great number of difficulties since these solvent compounds must meet a great number of criteria that are difficult to reconcile in particular in respect of their toxicity (an important factor in the event of leak), flammability, stability, density, vapour tension and their compatibility with active water repellent products, the propellant gas and possibly with other compounds likely to enter into the composition.

The purpose of the invention is therefore a water repellent composition, also called a Rain Repellent which does not polymerize on contact with air, does not produce any deposit and therefore any clogging of piping, valves, sprays or other parts of the supply circuit, does not leave any marks or hardened deposits on the treated surfaces, has excellent water repellent efficacy in heavy rain and which also meets all the above-mentioned conditions for such compositions, in particular stability and full solubilization of the active compound over a wide temperature range extending for example from −55° C. to 80° C.

A further purpose of the invention is to provide a water repellent composition which may be sprayed in aerosol form and comprises a vector fluid or solvent meeting among others those conditions cited above, in compliance with the regulations banning compounds that are harmful for the ozone layer, compatible with the active product that is to say especially solubilizing the latter over the whole temperature range, and the propellant gas, this composition being packed in a container placed under pressure with an inert gas.

A final purpose of the invention is a container under pressure placed in a vehicle, an aircraft—in particular an aeroplane, which is connected via a valve to a spray nozzle near the surface to be treated, for example the windscreen of the vehicle or aircraft.

These objectives and others are reached with the invention by an anti-wetting water repellent composition, also called a <<Rain-Repellent>> comprising:

a hydrophobic active agent a solvent or vector fluid compatible with the hydrophobic active agent or ingredient, characterized in that the solvent or vector fluid comprises at least one fluorinated hydrocarbon, liquid at ambient temperature, chosen from the (perfluoroalkyl)-ethylenes containing 6 to 10 carbon atoms, the 1H-hydrogenoperfluoroalkanes containing 6 to 8 carbon atoms, 1,1,1,2,3,4,4,5,5,5-decafluoropentane, n-perfluorohexane, 1,1,1,3,3-pentafluorobutane of formula $CF_3$—$CH_2$—$CF_2$—$CH_3$, 3,3,3,2,2-pentafluoro-1-propanol of formula $CF_3$—$CF_2$—$CH_2OH$, alkyl and perfluoroalkyl ethers of formula (1):

$$R^1_F\text{—}O\text{—}R^1 \quad (1)$$

in which $R^1_F$ is a perfluoroalkyl radical comprising from 2 to 6 carbon atoms and $R^1$ is an alkyl radical comprising from 1 to 4 carbon atoms, the (N-perfluoroalkyl-perfluoromopholines being possibly substituted by one or more perfluoroalkyl radicals of formula (II)

(II)

in which:

$R^2_F$ and $R^3_F$, identical or different, represent a perfluorinated aliphatic radical, linear or branched, comprising from 1 to 4 carbon atoms;

n is a whole number of 0 to 8;

the symbol F, within the cycle, means that the saturated cycle is fully fluorinated, that is to say that all the carbon atoms are bound to fluorine atoms or, possibly, to one or two $R^3_F$ radical(s), and their mixtures; and in that the hydrophobic active agent is a compound of organopolysiloxane type.

The composition of the invention comprising a solvent containing at least one fluorinated hydrocarbon, liquid at ambient temperature, chosen from the compounds cited above, meets regulatory restrictions, has no adverse effects for the environment, and has lesser, much reduced toxicity. This of particular importance for the product which must be handled in particular by maintenance staff and should any leaks occur in the supply circuit or in the storage container placed near the cockpit.

The composition of the invention also prevents the formation of solid deposits in piping, spray nozzles etc. which would impair the proper functioning of the systems, and the formation of hard layers, drip marks etc. on the treated surfaces and surrounding parts.

Finally, and among other properties, the composition of the invention has all the properties required of a fluid water repellent also called an <<anti-wetting agent>> or <<Rain-Repellent>>: firstly a favourable refractive index, no harsh effects on other materials entering into the manufacture of vehicles, aircraft etc. on which it may be used, low toxicity (of all its components) for personnel, non flammability, good stability during storage, in particular in containers under pressure, over a wide temperature range extending for example from −55° C. to 80° C.

In addition, the composition of the invention can also be applied during flight, in the rain and has very high water-repellent, anti-rain, anti-wetting efficiency under all flight conditions and at high speed whether or not windscreen wipers or other mechanical means are used.

Finally, unlike the compositions of the prior art, for which successive applications of product increase lack of visibility, the composition of the invention has the advantage of allowing several successive layers of product to be deposited without impairing its effectiveness while nevertheless permitting easy cleaning of the surface receiving said product.

The solvent of the composition according to the invention therefore comprises at least one fluorinated hydrocarbon, liquid at ambient temperature, chosen from the compounds mentioned above and compatible with the hydrophobic agent.

Among the (perfluoroalkyl)-ethylenes, the compounds of formula (III) are preferred

$$CF_3\text{—}(CF_2)_n\text{—}CH\text{=}CH_2 \quad (III)$$

in which n is a whole number from 3 to 7.

Again preferably n=3, or further preferably n=5.

The compound of formula (III) in which n=3, that is to say the (perfluorobutyl)-ethylene, is available from ELF ATOCHEM under the name <<FORALKYL E4>>.

The compound of formula (III) in which n=5, that is to say the (perfluorohexyl)-ethylene is available from ELF ATOCHEM under the name <<FORALKYL E6>>.

As an example of 1H-hydrogenoperfluoroalkanes, particular mention may be made of the compound 1H-hydrogenoperfluorohexane ($C_6F_{13}H$).

Among the alkyl and perfluoroalkyl ethers of formula (I) mentioned above, the specific ether compound of n-perfluorobutyl and methyl of formula $nC_4F_9$—O—$CH_3$ is preferred.

Among the compounds of formula (II) cited above, preference is given to the specific compound N-perfluoromethyl-perfluoromorpholine with the formula:

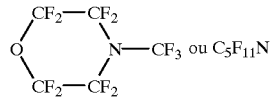

The fluorinated hydrocarbon chosen from the compounds cited above, and in particular the compound of formula (III) may be used alone or in a mixture with one or more other compounds chosen for example from the partially fluorinated inferior alkanes, glycol ethers, silicone oils of low molecular weight and methoxypropanol.

Preferably, monoalkyl ethers of alkyleneglycols are used such as the monomethyl ether of dipropylene glycol available from ARCO under the name ARCOSOLV® DPM or the mono(n)butyl ether of dipropylene glycol also called DPnB (dipropylene glycol mono(n)butyl ether).

In the event that a mixture of solvents is used, the fluorinated hydrocarbon at ambient temperature chosen from the compounds cited above, and in particular the compound of formula (I) preferably represents from 10 to 90 wt %, again preferably from 25 to 75% and further preferably from 40 to 60 wt %, for example 50% of the solvent mixture.

As an example of solvent mixtures in accordance with the invention, mention may be made of a mixture made up of (perfluorohexyl) ethylene or (perfluorobutyl) ethylene in a weight proportion for example of 25 to 75%, and of dipropylene glycol monomethyl ether, in a weight proportion of 25 to 75% for example.

The composition of the invention preferably comprises from 80% to 99 wt % preferably from 85 to 99% and further preferably from 90 to 98% of solvent; from 1 to 20%, preferably from 1 to 15% and further preferably from 2 to 10% of hydrophobic active agent.

The composition may possibly comprise an essence of perfume to give the aerosol a pleasant smell; this essence of perfume is preferably an essence with a lemon or orange smell, for example d-limonene, Gallia green or vanillin; the essence of perfume if used represents from 0.001 to 1% wt, preferably from 0.01 to 0.1% of the composition; its essential purpose is to warn the crew in the event of leakage of the product inside the cockpit.

Other compounds and adjuvants may be included in the composition to improve either one of its properties, for example stabilizers such as nitroalkanes such as nitromethane or nitroethane and acetals such as methylal or 1,3-dioxolane, or anti-corrosion agents in proportions of from 0.1 to 5% (preferably approximately 0.5%) related to the weight of the composition.

The hydrophobic active agent of organopolysiloxane type also called silicone liquid used in the composition of the invention is preferably chosen from the compounds of general formula (IV)

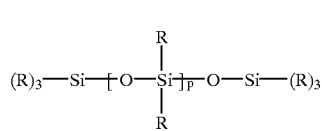

(IV)

in which p is a whole number from 0 to 150; and the R symbols, identical or different, each represent an alkyl or alcoxy group with 1 to 10 carbon atoms, cycloalkyl with 3 to 10 atoms, a phenyl group, a reagent group, a halogen (F, Cl, Br, I) or a hydrogen.

Preferably, the hydrophobic active agent of organopolysiloxane type is chosen from the compounds of silicone liquid or oil type comprising a reactive amino function, that is to say that in the formula (IV) at least one of the R groups is an amine group, that is to say for example a group such as one of those already described above which carries an amino group.

Such compounds are available for example from General Electric under the trade name SF 1706.

These compounds proved to be particularly suitable in particular when used in the proportions given above and preferably from 2 to 10%, for example at 10 wt %, with the preferred solvent mixtures mentioned above: namely, perfluorohexylethylene or perfluorobutylethylene and dipropyleneglycol monomethyl ether in proportions in the solvent mixture of preferably 75 to 25% and from 25 to 75% for example of 25/75 or 75/25.

Preferably, according to the invention, the composition is packaged in a disposable pressurized container placed under pressure using a suitable gas; among such gases nitrogen is preferred as it is not harmful for the environment and does not give rise to any problems of flammability, toxicity etc.

Argon may also be used or F 134a (1,1,1,2-tetrafluoroethane).

The compositions of the invention find application in the removal of water from any surface, in particular a transparent surface, on which the presence of water is undesired; it may, in particular be a glass surface, a window that is part of a vehicle, boat, aircraft such as an aeroplane, helicopter etc. and in particular the windscreen of a vehicle or aircraft; it may also be the glass surface of headlights, camera window, guide apparatus, laser or not, a guided missile etc. or any other glass surface, or the helmet visor of a car or motorcycle racing driver, or any other apparatus. The water be derived from any source, whether rain water or other, or water loaded with various minerals, for example sea water against which the composition of the invention is also effective, it can therefore be used in seaborne aircraft, aeroplanes and helicopters, hydroplanes etc.

The invention shall be described below with the following examples given for illustrative purposes and are not restrictive.

EXAMPLES

Example 1

A water repellent composition was prepared by dissolving 45 g of SF 1706 polysiloxane in 455 g of a mixture made up of (weight %):

| Foralkyl E6 | 24.87% |
| --- | --- |
| DPM | 74.62% |
| Nitromethane | 0.50% |
| Gallia Green | 0.01% |

This composition was packaged in conventional manner in a container under pressure placed in the spray circuit for the cockpit windscreen of an AIRBUS-A300-A310 aeroplane.

It was tested under various conditions of flight, speed, landing, take-off and rain; elution of the water from the cockpit windscreen was excellent each time. It was found that the efficacy of the composition was further heightened with the simultaneous use of the aircraft's windscreen wipers. However even without setting the windscreen wipers in operation, excellent visibility was obtained under all flight and rain configurations.

The outer surface of the aeroplane was then examined and it was found that this surface was perfectly clear and clean; the windows and other surfaces showed no deposit, no drips, no marks, no hard layer. No incident occurred during these tests; no fouling or blocking of the spray nozzles, valves or piping occurred in the spray circuit.

One product of the prior art <<RAINBOE>> was tested under the same conditions. Several incidents due to fouling of the spray nozzles impaired operation, preventing spraying onto the windows, while marks and hardened deposits that were extremely difficult to remove were found on windscreen windows and neighbouring surfaces.

Examples 2 to 14

A water repellent composition was prepared by dissolving 45 g of SF 1706 polysiloxane in 455 g of a compound or mixture of compounds whose composition (weight %) is given for each of the examples in Table I below:

TABLE I

| EXAMPLES | 2 | 3 | 4 | 5 | 6 | 7 | 8 | 9 | 10 | 11 | 12 | 13 | 14 |
|---|---|---|---|---|---|---|---|---|---|---|---|---|---|
| $CF_3$—$CH_2$—$CF_2$—$CH_3$ | 25 | | | | | | | | | | | | |
| $C_4F_9$—CH=$CH_2$ | | 25 | 25 | | | | | | | | 40 | 50 | |
| $C_6F_{13}$—CH=$CH_2$ | | | | 25 | | | | | | 25 | | | |
| $C_6H_{13}H$ | | | | | 25 | | | | | | | | |
| $CF_3$—$(CHF)_2$—$CF_2CF_3$ | | | | | | 25 | | | | | | | |
| $nC_4F_9$—O—$CH_3$ | | | | | | | 25 | | | | | | |
| $nC_6F_{14}$ | | | | | | | | 25 | | | | | |
| $C_5F_{11}NO$ | | | | | | | | | 25 | | | | |
| $CF_3$—$CF_2$—$CH_2$—OH | | | | | | | | | | | | | 100 |
| DPM | 75 | 75 | | 75 | 75 | 75 | 75 | 75 | 75 | | 60 | | |
| Methoxypropanol | | | 75 | | | | | | | | | | |
| DpnB* | | | | | | | | | | 75 | | 50 | |

*DPnB means dipropylene glycol monobutyl ether

The compositions obtained were packaged in a container for a 125 ml aerosol with HFC 134a as propellant gas in the proportion of 70 g of composition per 30 g of 134a.

On a square window pane with sides of 30 cm, placed horizontally, 2 to 3 sprays were directed to cover a surface substantially in the shape of a disc of approximately 10 cm in diameter. The composition was spread over this surface with absorbent paper or cloth.

The window pane was then placed vertically and approximately 5 ml of water were sprayed onto it using an aerosol.

After several seconds the flow of water applied to the part of the window pane treated by any one of the compositions of examples 2 to 14 was observed.

On the non-treated part of the window pane, however, the water was seen to remain in the form of droplets attached to the glass. These tests show the particularly advantageous rain repellent effect of the compositions prepared in accordance with the invention.

We claim:

1. Water repellent composition comprising consisting essentially of a hydrophobic agent and a solvent compatible with the hydrophobic agent, characterized in that the solvent comprises at least one fluorinated hydrocarbon, liquid at ambient temperature, chosen from the (perfluoroalkyl)-ethylenes containing 6 to 10 carbon atoms; lH-hydrogenoperfluoroalkanes containing 6 to 8 carbon atoms; 1,1,1,2,3,4,4,5,5,5-decafluoropentane; n-perfluorohexane; 1,1,1,3,3-pentafluorobutane with formula $CF_3$—$CH_2$ —$CF_2$—$CH_3$; 3,3,3,2,2-pentafluoro-1-propanol with the formula $CF_3$—$CF_2$—$CH_2OH$; alkyl and perfluoroalkyl ethers of formula (I):

$$R^1{}_F\text{—O—}R^1 \qquad (I)$$

in which $R^1{}_F$ is a perfluoroalkyl radical comprising from 2 to 6 carbon atoms and $R^1$ is an alkyl radical comprising from 1 to 4 carbon atoms; an N-perfluoroalkyl-perfluoromorpholine, optionally substituted by one or more perfluoroalkyl radicals, of formula (II)

(II)

in which:

$R^2{}_F$ and $R^3{}_F$, identical or different, represent a perfluorinated aliphatic radical, linear or branched, comprising from 1 to 4 carbon atoms, n is a whole number from 0 to 8, the symbol F, within the cycle, means that the saturated cycle is fully fluorinated, that is to say that all the carbon atoms are bound to fluorine atoms or, optionally, to one or two $R^3{}_F$ radicals; and their mixtures; and in that the hydrophobic active agent is an organpolysloxane compound of formula (IV);

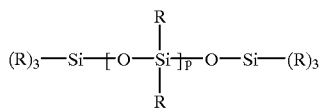

(IV)

in which p is a whole number from 0 to 150; and the R symbols, identical or different, each represent an alkyl or alkoxy group with 1 to 10 carbon atoms, cycloalkyl with 3 to 10 carbon atoms, a phenyl group, a reagent group, a halogen or a hydrogen; provided that at least one of the R group in formula (IV) is substituted with an amino group.

2. Composition in accordance with claim 1, characterized in that the solvent comprises said fluorinated hydrocarbon, liquid at ambient temperature, either alone or in a mixture with one or other compounds chosen from among the partly fluorinated inferior alkanes, glycol ethers, silicon oils of low molecular weight, and methoxypropanol.

3. Composition in accordance with claim 2, characterized in that in the event that a mixture of solvents is used, said fluorinated hydrocarbon, liquid at ambient temperature, represents from 10 to 90 wt % of the mixture of solvents.

4. Composition in accordance with claim 1, characterized in that said (perfluoroalkyl)-ethylenes meet formula (III)

$$CF_3\text{—}(CF_2)_n\text{—CH=}CH_2 \qquad (III)$$

in which n is a whole number from 3 to 7.

5. Composition in accordance with claim 1, characterized in that said 1H-hydrogenoperfluoroalkane is lH-hydrogenoperfluorohexane.

6. Composition in accordance with claim 1, characterized in that said alkyl and perfluoroalkyl ether of formula (I) is the ether of n-perfluorobutyl and methyl with the formula $nC_4F_9$—O—$CH_3$.

7. Composition in accordance with claim 1, characterized in that said compound of formula (II) is N-perfluoromethyl-perfluoromorpholine with the formula:

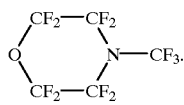

8. Composition in accordance with claim 4, characterized in that in the compound of formula (III) n is 3 or 5, that is to say that the compound of formula (III) is (perfluorobutyl)-ethylene or (perfluorohexyl)-ethylene.

9. Composition in accordance with claim 1, characterized in that it comprises a weight percentage of 80 to 99% of solvent and of 1 to 20% of hydrophobic active agent.

10. Composition in accordance with claim 1, characterized in that it also comprises at least one essence of perfume in the proportion of 0.001 to 1 wt % in relation to the composition.

11. Composition in accordance with claim 2, characterized in that the other compound of the mixture of solvents is dipropylene glycol monomethyl ether (DPM).

12. Composition in accordance with claim 9, characterized in that it comprises from 85 to 99% of solvent and from 1 to 15% of organopolysiloxane.

13. Composition in accordance with claim 12, characterized in that it comprises from 90 to 98% of solvent and from 2 to 10% of organopolysiloxane.

14. Composition in accordance with claim 8, characterized in that the solvent is made up of a mixture of (perfluorobutyl)-ethylene or (perfluorohexyl)-ethylene and of dipropylene glycol monomethyl ether.

15. Composition in accordance with claim 9, characterized in that the compound of formula (IV) is the compound available from General Electric under the trade name SF 1706.

16. Composition in accordance with claim 15, characterized in that the (perfluorobutyl)-ethylene or (perfluorohexyl)-ethylene represents in weight from 25 to 75% of the mixture of solvents, and in the SF 1706 compound represents from 2 to 10 wt % of the composition.

17. Composition in accordance with claim 10, characterized in that the essence of perfume is d-limonene, Gallia green or Vanillin.

18. Composition in accordance with claim 1, characterized in that it also comprises at least one stabilizer in the proportion of 0.1 to 5% related to the weight of the composition.

19. Container under pressure containing a composition in accordance with claim 1 and an inert vector gas under pressure.

20. Container in accordance with claim 19, characterized in that the inert gas is nitrogen.

21. Method for removing water from a surface comprising applying on said surface a water repellent composition comprising a hydrophobic agent and a solvent compatible with the hydrophobic agent, characterized in that the solvent comprises at least one fluorinated hydrocarbon, liquid at ambient temperature, chosen from the (perfluoroalkyl)-ethylenes containing 6 to 10 carbon atoms; IH-hydrogenoperfluoroalkanes containing 6 to 8 carbon atoms; 1,1,1,2,3,4,4,5,5,5-decafluoropentane; n-perfluorohexare; 1,1,1,3,3-pentafluorobutane with formula $CF_3—CH_2—CF_2—CH_3$; 3,3,3,2,2-pentafluoro-1-propanol with the formula $CF_3—CF_2—CH_2OH$; alkyl and perfluoroalkyl ethers of formula (I):

in which $R^1_F$ is a perfluoroalkyl radical comprising from 2 to 6 carbon atoms and $R^1$ is an alkyl radical comprising from 1 to 4 carbon atoms; an N-perfluoroalkyl-perfluoromorpholine, optionally substituted by one or more perfluoroalkyl radicals, of formula (II):

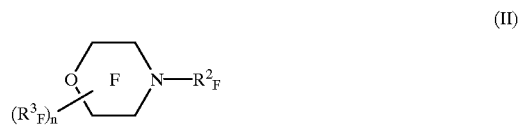

in which:
$R^2_F$ and $R^3_F$, identical or different, represent a perfluorinated aliphatic radical, linear or branched, comprising from 1 to 4 carbon atoms, n is a whole number from 0 to 8, the symbol F, within the cycle, means that the saturated cycle is fully fluorinated, that is to say that all the carbon atoms are bound to fluorine atoms or, optionally, to one or two $R^3_F$ radicals; and their mixtures; and in that the hydrophobic agent is an organopolysiloxane compound of formula (IV):

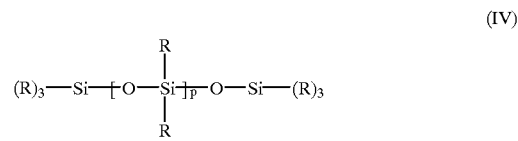

in which p is a whole number from 0 to 150; and the R symbols, identical or different, each represent an alkyl or alkoxy group with 1 to 10 carbon atoms, cycloalkyl with 3 to 10 carbon atoms, a phenyl group, a reagent group, a halogen or a hydrogen; provided that at least one of the R group in formula (IV) is substituted with an amino group.

22. Method according to claim 21, wherein said surface is a transparent surface.

23. Method according to claim 22, wherein said transparent surface is a window of a vehicle, boat or aircraft.

24. Method according to claim 23, wherein said aircraft is an airplane or a helicopter.

25. Method according to claim 23, wherein said window is a windscreen.

26. Method according to claim 22, wherein said transparent surface is a helmet visor of a car or motorcycle racing driver.

27. Method according to claim 22, wherein said transparent surface is a glass surface.

28. Method according to claim 27, wherein said glass surface is headlight, camera window, or a component of a guide apparatus, optionally containing a laser, or a guided missile.

* * * * *